US005960387A

United States Patent [19]

Rapp et al.

[11] Patent Number: 5,960,387

[45] Date of Patent: Sep. 28, 1999

[54] METHOD AND APPARATUS FOR COMPRESSING AND DECOMPRESSING A VOICE MESSAGE IN A VOICE MESSAGING SYSTEM

[75] Inventors: Robert Andrew Rapp, Carrollton; Stephen Michael Papa; John Zhang, both of Fort Worth; Peixin Chen, Plano, all of Tex.

[73] Assignee: Motorola, Inc., Schaumburg, Ill.

[21] Appl. No.: 08/873,533

[22] Filed: Jun. 12, 1997

[51] Int. Cl.[6] .......... G10L 3/02; H04B 1/66

[52] U.S. Cl. .......... 704/207; 704/230; 704/500

[58] Field of Search .......... 704/205, 207, 704/211, 229, 230, 500, 502, 503

[56] References Cited

U.S. PATENT DOCUMENTS

| | | | |
|---|---|---|---|
| 4,696,038 | 9/1987 | Doddington et al. | 704/207 |
| 4,792,975 | 12/1988 | MacKay | 704/211 |
| 4,875,038 | 10/1989 | Siwiak et al. | 340/825.44 |
| 4,964,166 | 10/1990 | Wilson | 704/229 |
| 4,989,247 | 1/1991 | Van Hemert | 704/207 |
| 5,216,744 | 6/1993 | Alleyne et al. | 704/200 |
| 5,321,636 | 6/1994 | Beerends | 704/207 |
| 5,327,521 | 7/1994 | Savic et al. | 704/203 |
| 5,341,432 | 8/1994 | Suzuki et al. | 704/211 |
| 5,666,350 | 9/1997 | Huang et al. | 704/207 |
| 5,704,000 | 12/1997 | Swaminathan et al. | 704/207 |
| 5,774,836 | 6/1998 | Bartkowiak et al. | 704/207 |
| 5,781,885 | 7/1998 | Inoue et al. | 704/267 |
| 5,809,459 | 9/1998 | Bergstrom et al. | 704/223 |
| 5,812,967 | 9/1998 | Ponceleon et al. | 704/207 |
| 5,828,995 | 10/1998 | Satyamurti et al. | 704/211 |
| 5,873,059 | 2/1999 | Iijima et al. | 704/207 |

*Primary Examiner*—David R. Hudspeth
*Assistant Examiner*—Martin Lerner
*Attorney, Agent, or Firm*—R. Louis Breeden

[57] ABSTRACT

A processing system (210) subdivides (302) a voice message into a plurality of portions, and estimates (304) a plurality of preferred pitch periods corresponding to the plurality of portions. The processing system calculates (314) a plurality of segment sizes corresponding to the plurality of preferred pitch periods, and compresses (316) each of the plurality of portions by utilizing a corresponding one of the plurality of segment sizes in a speech compression algorithm, thereby generating a compressed message. The processing system determines (326) from the plurality of segment sizes a preferred segment size for decompressing the compressed message; and sends (328) the preferred segment size, along with the compressed message, to a receiver (122) for use in decompressing the compressed message in a speech decompression algorithm.

16 Claims, 4 Drawing Sheets

200

300

400

METHOD AND APPARATUS FOR COMPRESSING AND DECOMPRESSING A VOICE MESSAGE IN A VOICE MESSAGING SYSTEM

FIELD OF THE INVENTION

This invention relates in general to voice messaging systems, and more specifically to a method and apparatus for compressing and decompressing a voice message in a voice messaging system.

BACKGROUND OF THE INVENTION

Current radio voice messaging systems utilize digital speech compression prior to transmission and digital speech decompression techniques after reception to conserve transmission time. Such systems also utilize a digital address and call set-up signal, followed by an analog signal for transmitting the compressed voice message to a receiver. Because the voice message is sent as an analog signal, the call set-up information typically is sent only once and applies to the whole voice message.

One of the parameters sent in the call set-up signal is the segment size, a parameter utilized by a decompression algorithm in the receiver. The segment size parameter is determined from pitch period characteristics of the voice message. To reduce latency, prior art voice messaging systems have examined only a first portion, e.g., first 2 seconds, of the voice message to estimate the pitch period of the entire message. In addition, prior art systems estimated the pitch period by calculating the average pitch period of the first portion.

The prior art techniques have resulted in two problems. First, by examining only the first portion of the message, changes in pitch period which can occur after the first portion of the message are not considered in estimating the pitch period of the message. Second, by calculating the average pitch period, even some sections of the first portion of the message can exhibit a pitch period much different from the average pitch period. These problems can produce undesirable artifacts in the decompressed message.

Thus, what is needed is a method and apparatus that can overcome the problems that have resulted from the use of the prior art techniques. Changes that occur both during and after the first portion of the message need to be considered in determining the pitch period used for compressing and decompressing the message. Preferably, this will be accomplished without a significant increase in latency.

SUMMARY OF THE INVENTION

An aspect of the present invention is a method for compressing and decompressing a voice message in a voice messaging system. The method comprises the steps of subdividing the voice message into a plurality of portions, and estimating a plurality of preferred pitch periods corresponding to the plurality of portions. The method further comprises the steps of calculating a plurality of segment sizes corresponding to the plurality of preferred pitch periods, and compressing each of the plurality of portions by utilizing a corresponding one of the plurality of segment sizes in a speech compression algorithm, thereby generating a compressed message. The method also includes the steps of determining from the plurality of segment sizes a preferred segment size for decompressing the compressed message; and sending the preferred segment size, along with the compressed message, to a receiver for use in decompressing the compressed message in a speech decompression algorithm.

Another aspect of the present invention is a controller for compressing and decompressing a voice message in a voice messaging system including a portable subscriber unit. The controller comprises a network interface for receiving the voice message, and a processing system coupled to the network interface for processing the voice message. The controller further comprises an output interface coupled to the processing system for outputting the message. The processing system is programmed to subdivide the voice message into a plurality of portions, and to estimate a plurality of preferred pitch periods corresponding to the plurality of portions. The processing system is further programmed to calculate a plurality of segment sizes corresponding to the plurality of preferred pitch periods, and to compress each of the plurality of portions by utilizing a corresponding one of the plurality of segment sizes in a speech compression algorithm, thereby generating a compressed message. The processing system is also programmed to determine from the plurality of segment sizes a preferred segment size for decompressing the compressed message, and to send the preferred segment size, along with the compressed message, to a receiver for use in decompressing the compressed message in a speech decompression algorithm.

DETAILED DESCRIPTION OF THE DRAWINGS

Figure 1:
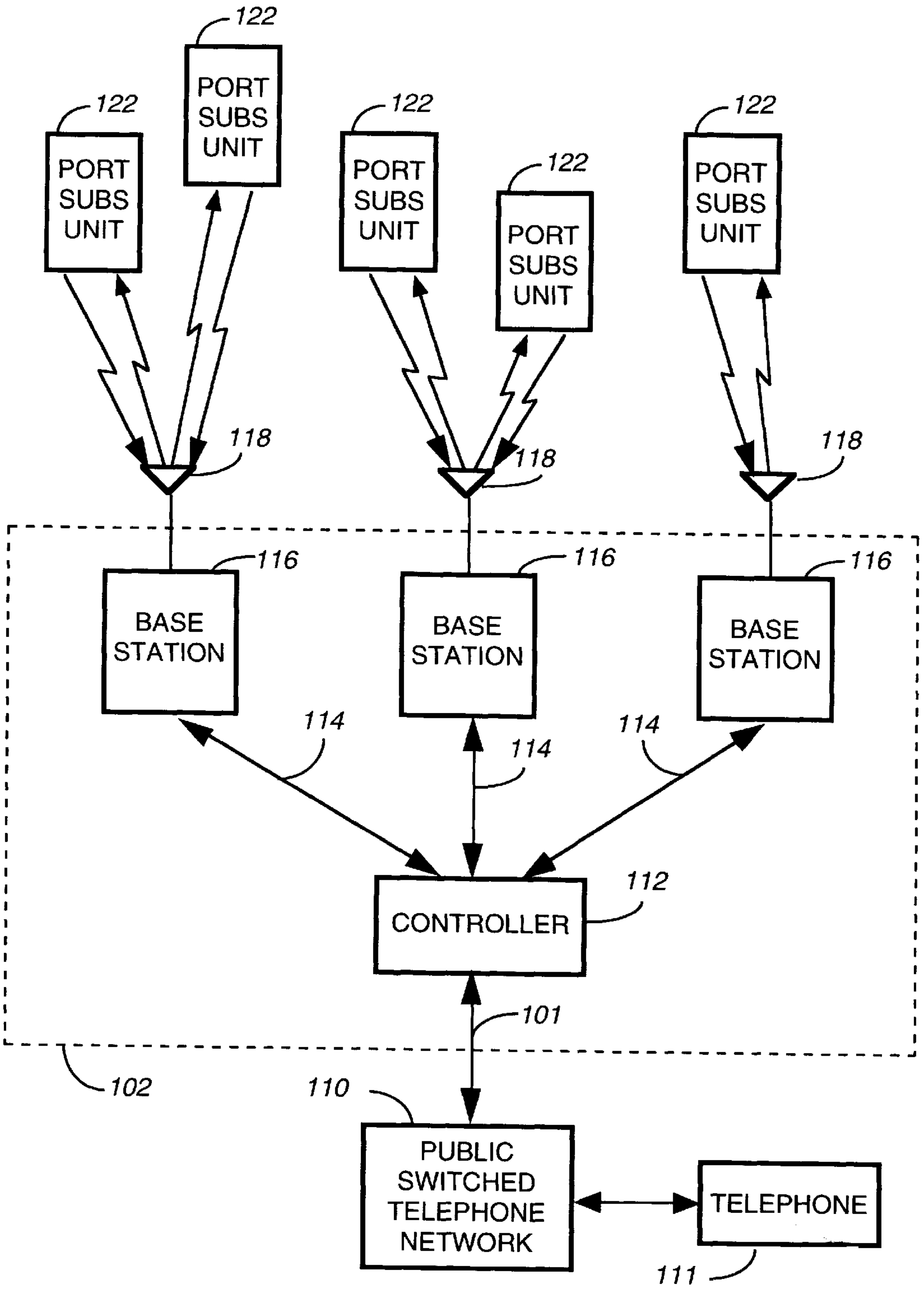
FIG. 1 is an electrical block diagram of a voice messaging system in accordance with the present invention.

Referring to FIG. 1, an electrical block diagram of a voice messaging system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. The portable subscriber units 122 are preferably conventional Tenor™ voice messaging units also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference. It will be appreciated that, alternatively, the present invention can be applied to a one-way voice messaging system as well.

The controller 112 preferably is coupled by telephone links 101 to a public switched telephone network (PSTN) 110 for receiving selective call message originations therefrom. Selective call originations comprising voice messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
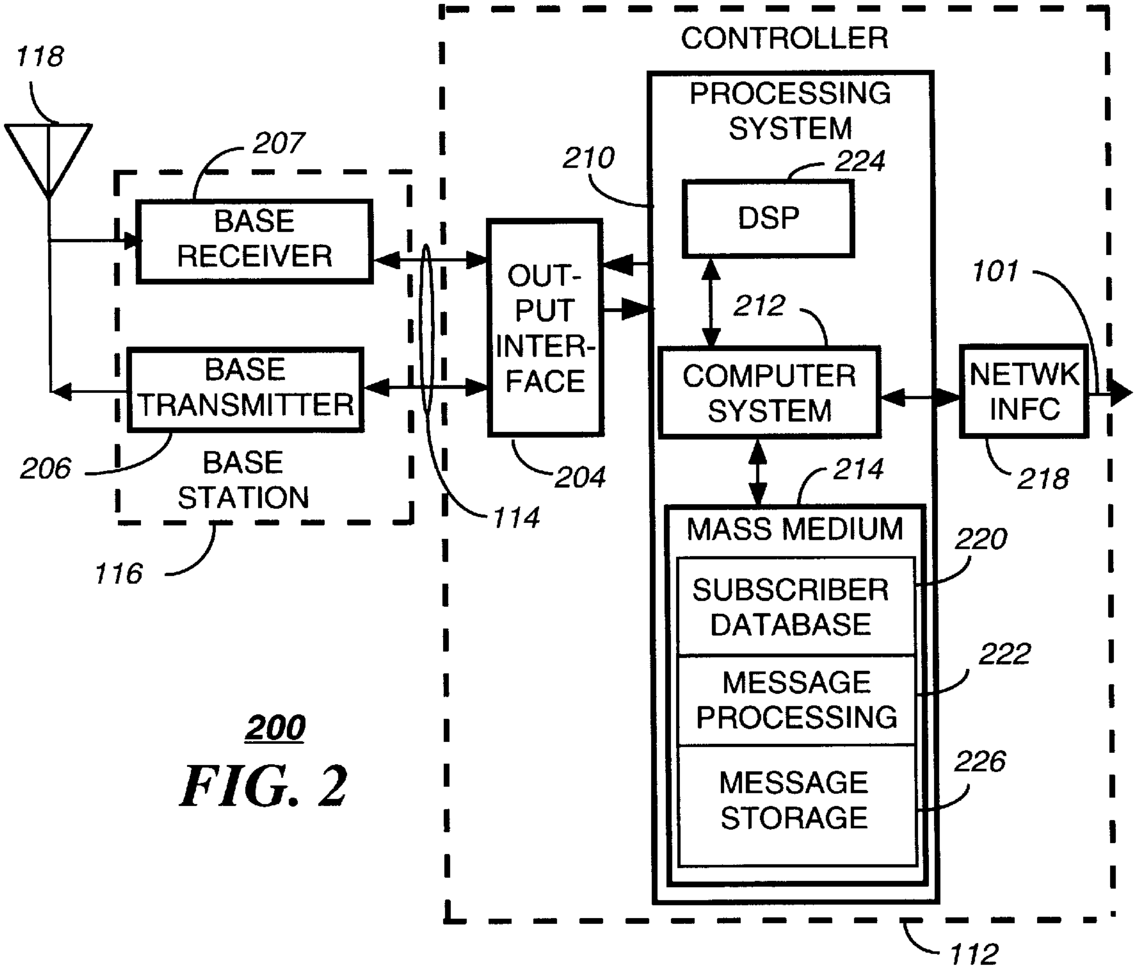
FIG. 2 is an electrical block diagram of portions of a controller and a base station in accordance with the present invention.

FIG. 2 is a simplified electrical block diagram 200 of portions of the controller 112 and the base station 116 in accordance with the present invention. The controller 112 includes a processing system 210, a conventional output interface 204, and a conventional network interface 218. The base station 116 includes a base transmitter 206 and at least one base receiver 207. At least a portion of the processing performed on the voice messages preferably is implemented in at least one digital signal processor (DSP) 224 executing software readily written by one of ordinary skill in the art, given the teachings of the instant disclosure. Alternatively, the voice processing may be implemented all or in part as one or more integrated circuits. In particular, the preferred embodiment uses a model TMS320C31 DSP manufactured by Texas Instruments, Inc. It will be appreciated that, alternatively, other similar DSPs can be utilized as well for the DSP 224.

The processing system 210 is used for directing operations of the controller 112. The processing system 210 preferably is coupled through the output interface 204 to the base transmitter 206 via the communication link 114. The processing system 210 preferably also is coupled through the output interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound voice messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber user information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212, DSPs 224 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

The mass medium 214 preferably includes software and various databases utilized in accordance with the present invention. In particular, the mass medium 214 includes a message processing element 222 which programs the processing system 210 to perform in accordance with the present invention, as will be described further below. In addition, the mass medium 214 includes a message storage area 226 for storing digitized voice messages. It will be appreciated that the controller 112 and the base station 116 can be either collocated or remote from one another, depending upon system size and architecture. It will be further appreciated that in large systems functional elements of the controller 112 can be distributed among a plurality of networked controllers.

Figure 3:
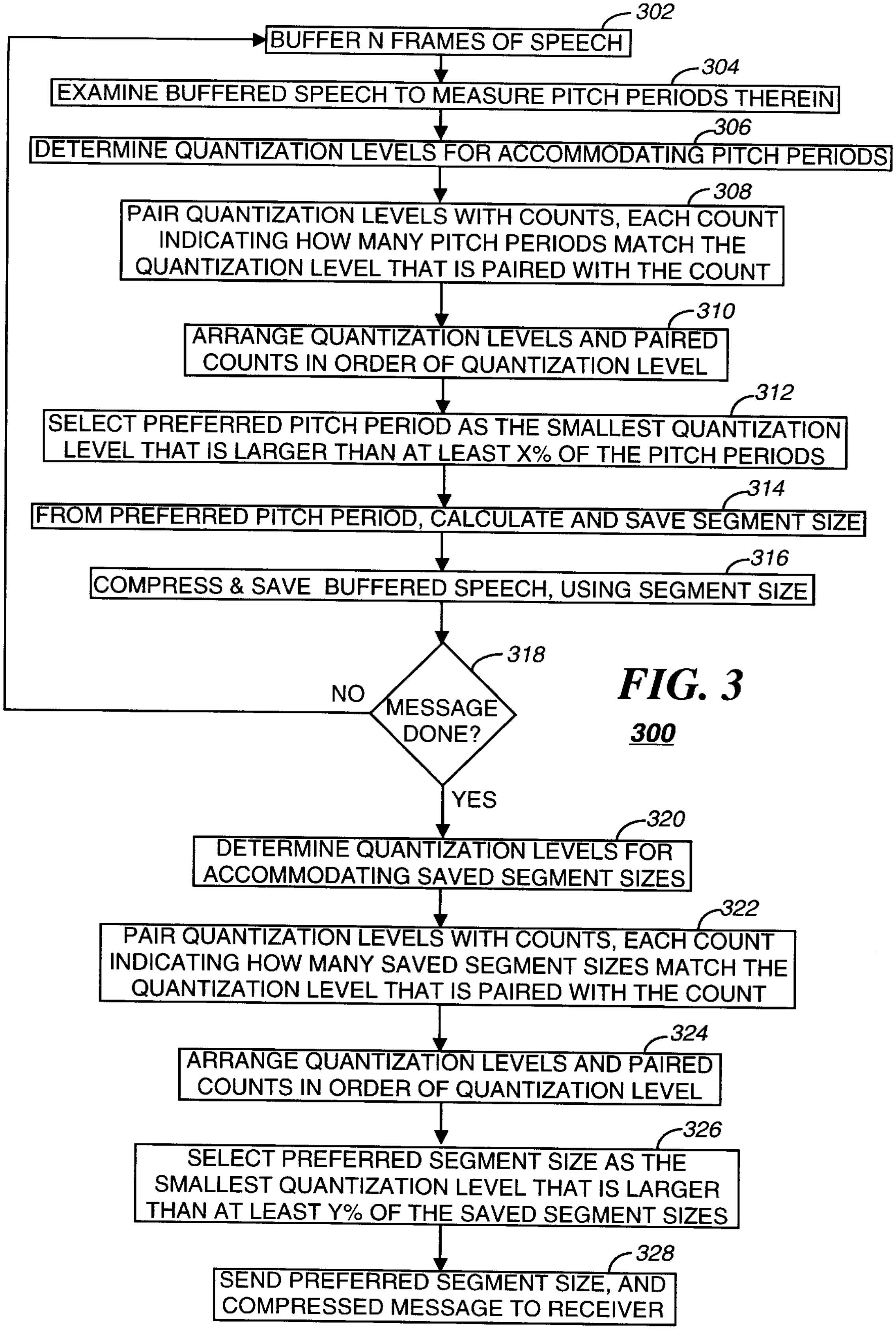
FIG. 3 is a flow chart depicting operation of the voice messaging system in accordance with the present invention.

FIG. 3 is a flow chart 300 depicting operation of the voice messaging system in accordance with the present invention. The flow begins with step 302, where the processing system 210 buffers N frames of speech, N preferably corresponding to about two seconds of speech from a portion of a voice message. The processing system 210 then examines 304 the buffered speech using well-known techniques to locate and measure the pitch periods therein. The pitch periods are then quantized, preferably into integer multiples of 10 speech samples in length for efficient processing. The processing system 210 then determines 306 a suitable range of quantization levels that will accommodate the quantized pitch periods. (Alternatively, a fixed, predetermined plurality of quantization levels can be utilized, as well.) Next the processing system 210 pairs 308 each of the quantization levels with a count representing how many pitch periods measured in the buffered speech match the quantization level paired with the count. The processing system then arranges 310 the quantization levels and the paired counts in an order corresponding to the quantization level, conceptually forming a histogram 400 of quantized pitch periods, as depicted in FIG. 4 and described further below.

The processing system 210 then examines the histogram 400 of quantized pitch periods to select 312 a preferred pitch period corresponding to the smallest quantization level that is larger than at least X percent, e.g., 90%, of the quantized pitch periods found in the N frames of speech. The processing system 210 then calculates 314 a segment size corresponding to the preferred pitch period. Preferably, the segment size is calculated as twice the size of the (quantized) preferred pitch period. The processing system 210 then compresses 316 the buffered speech, using the calculated segment size, preferably in a well-known overlap-add speech compression algorithm, and saves the compressed speech in the message storage area 226. The processing system 210 checks 318 whether the entire message has been compressed. If not, flow returns to step 302 to get the next buffer of speech frames forming the next portion of the message to be processed.

If, on the other hand, the entire message has been compressed, the processing system 210 then determines 320 a suitable range of quantization levels that will accommodate the saved segment sizes accumulated in steps 302–318. The processing system 210 then pairs 322 each of the quantization levels with a count representing how many saved segment sizes for the voice message match the quantization level paired with the count. The processing system then arranges 324 the quantization levels and the paired counts in an order corresponding to the quantization level, conceptually forming the histogram 400 of quantized segment sizes. The processing system 210 then examines the histogram 400 of quantized segment sizes to select 326 a preferred segment size corresponding to the smallest quantization level that is larger than at least Y percent, e.g., 90%, of the saved segment sizes found in the message. The processing system 210 then sends 328 the preferred segment size, along with the compressed message, to a receiver for use in decompressing the compressed message, preferably in an overlap-add decompression algorithm. It will be appreciated that, alternatively, other types of speech compression and decompression algorithms can be utilized with the present invention.

Figure 4:
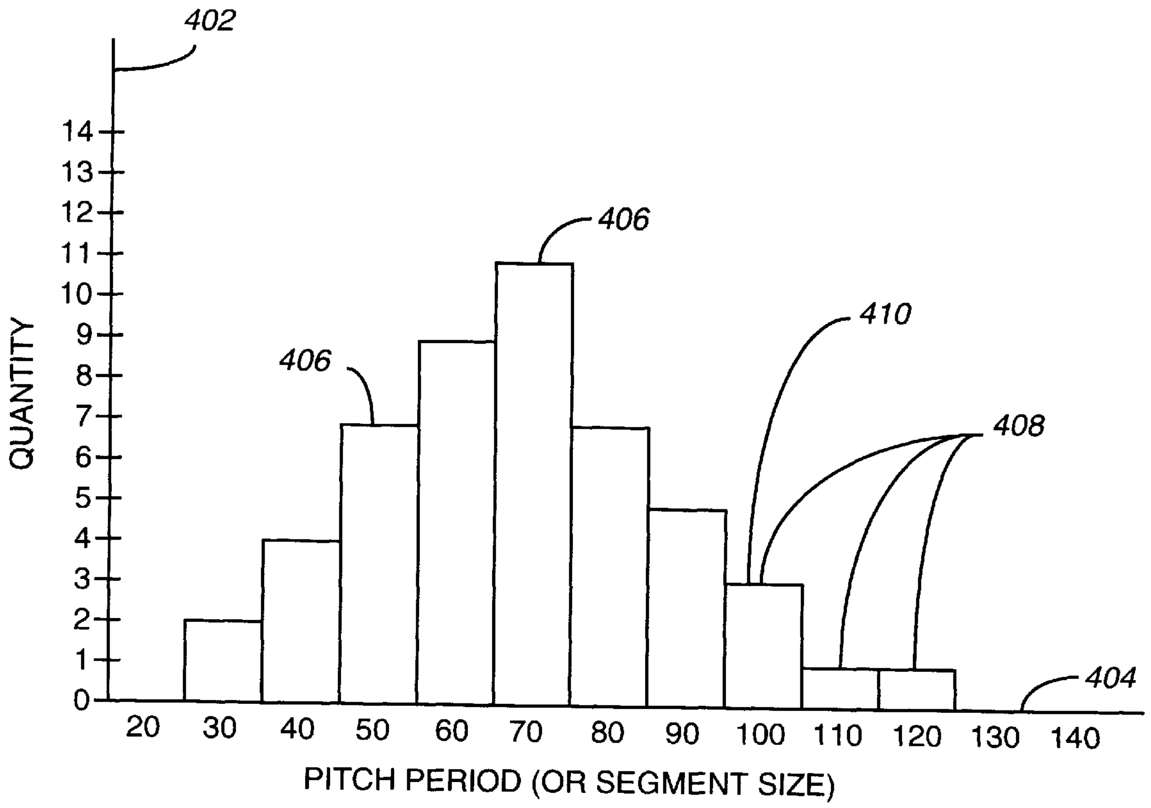
FIG. 4 is a histogram further clarifying selection of preferred pitch and segment size in the voice messaging system in accordance with the present invention.

FIG. 4 is a histogram further clarifying selection of preferred pitch and segment size in the voice messaging system in accordance with the present invention. The horizontal axis 404 represents pitch period quantization level. The vertical axis 402 represents quantity of pitch periods. The height of each of the rectangles 406 thus represents how many quantized pitch periods measured in each buffer of speech match the pitch period quantization level indicated on the horizontal axis below each rectangle 406. If, for example, the processing system 210 is to select the smallest quantization level that is larger than at least 90% of the quantized pitch periods, then the pitch period quantization level 410 becomes the preferred pitch period. This is because the group 408 of quantization levels match the five largest quantized pitch periods. According to the histogram, there are a total of 50 quantized pitch periods represented. Thus the group 408 are all larger than 90% of the quantized pitch periods in the buffer of speech. The smallest quantization level of the group 408 is the quantization level 410, representing a pitch period of 100. The preferred pitch period for the buffer is thus 100 in this example.

An advantage of using the above described histogram technique for selecting the preferred pitch period, as compared to prior art techniques of calculating the average pitch period for the buffer is better compression of larger pitch periods under varying pitch conditions. The example histogram 400 indicates that quantized average pitch period is 70. Using 70 as the estimated pitch period for compression would ignore 17 occurrences of quantized pitch periods greater than that level. Using techniques in accordance with the present invention, it is advantageously possible to control the number of large quantized pitch periods that remain above the preferred pitch period. Evaluations have concluded that allowing about 10% of the largest quantized pitch periods to be above the preferred pitch period is optimal. This allows elimination of possible pitch estimation errors, but does not produce noticeable artifacts in the decompressed speech. Using an estimated pitch period that is too small can cause the decompressed speech to lose periodicity and become distorted. Using an estimated pitch period that is too large can cause echoes in the speech, but the distortion is minimal. In other words, empirical evaluations have demonstrated that, if one must err, it is better to estimate the pitch interval to be too large rather than too small.

When the processing system 210 has finished calculating and saving the segment sizes corresponding to all of the preferred pitch periods of the voice message, the histogram technique is again employed (steps 320–326), this time with the segment sizes calculated for each buffer of the entire message forming the histogram. It will be appreciated that the values of the segment sizes will be proportional to, but different from, the values of the pitch periods, the segment sizes being preferably twice the pitch periods. Again, this technique allows elimination of the largest segment sizes (those larger than a predetermined percentage, e.g., 90%, of all the segment sizes). This has been shown to be a particularly advantageous technique for messages having a mixed content of short and long pitch periods, e.g., a female speaker in the presence of a background male speaker.

Thus, it should be apparent from the foregoing disclosure that the present invention provides a method and apparatus that advantageously takes into consideration changes that occur both during and after the first portion of the message in determining the segment sizes used for compressing and decompressing the message. This is accomplished with no significant increase in latency, because compression is done in near-real time, without the need to buffer the entire message before compression can begin.

Many modifications and variations of the present invention are possible in light of the above teachings. For example, the estimation of the preferred pitch periods of the message portions and/or the determining of the preferred segment size can, alternatively, be accomplished in some other manner, e.g., by selecting the largest pitch period or segment size, without using the histogram technique described above. Thus, it is to be understood that, within the scope of the appended claims, the invention may be practiced other than as described herein above.

What is claimed is:

1. A method for compressing and decompressing a voice message in a voice messaging system, the method comprising the steps of:

subdividing the voice message into a plurality of portions;

estimating a plurality of preferred pitch periods corresponding to the plurality of portions;

calculating a plurality of segment sizes corresponding to the plurality of preferred pitch periods;

compressing each of the plurality of portions by utilizing a corresponding one of the plurality of segment sizes in a speech compression algorithm, thereby generating a compressed message;

determining from the plurality of segment sizes a preferred segment size for decompressing the compressed message; and sending the preferred segment size, along with the compressed message, to a receiver for use in decompressing the compressed message in a speech decompression algorithm.

2. The method of claim 1, wherein the estimating step comprises for each portion of the plurality of portions the steps of:

examining the portion to measure a plurality of quantized pitch periods therein; and determining a plurality of quantization levels which can accommodate the plurality of quantized pitch periods.

3. The method of claim 2, further comprising the step of pairing the plurality of quantization levels with a corresponding plurality of counts, a count indicating how many of the plurality of quantized pitch periods match a quantization level that is paired with the count.

4. The method of claim 3, further comprising the step of arranging the plurality of quantization levels and the corresponding plurality of counts in an order corresponding to quantization level, thereby creating an ordered plurality of quantization levels and a corresponding ordered plurality of counts.

5. The method of claim 4, further comprising the step of selecting a preferred pitch period from the ordered plurality of quantization levels, the preferred pitch period being a smallest one of the ordered plurality of quantization levels that is greater in level than a predetermined percentage of the plurality of quantized pitch periods, as determined from the corresponding ordered plurality of counts.

6. The method of claim 1, wherein the determining step comprises the steps of:

determining a plurality of quantization levels which can accommodate the plurality of segment sizes; and pairing the plurality of quantization levels with a corresponding plurality of counts, a count indicating how many of the plurality of segment sizes match a quantization level that is paired with the count.

7. The method of claim 6, further comprising the step of arranging the plurality of quantization levels and the corresponding plurality of counts in an order corresponding to quantization level, thereby creating an ordered plurality of quantization levels and a corresponding ordered plurality of counts.

8. The method of claim 7, further comprising the step of selecting the preferred segment size from the ordered plurality of quantization levels, the preferred segment size being a smallest one of the ordered plurality of quantization levels that is greater in level than a predetermined percentage of the plurality of segment sizes, as determined from the corresponding ordered plurality of counts.

9. A controller for compressing and decompressing a voice message in a voice messaging system including a portable subscriber unit, the controller comprising:

a network interface for receiving the voice message;

a processing system coupled to the network interface for processing the voice message; and an output interface coupled to the processing system for outputting the message, wherein the processing system is programmed to:

subdivide the voice message into a plurality of portions;

estimate a plurality of preferred pitch periods corresponding to the plurality of portions;

calculate a plurality of segment sizes corresponding to the plurality of preferred pitch periods;

compress each of the plurality of portions by utilizing a corresponding one of the plurality of segment sizes in a speech compression algorithm, thereby generating a compressed message;

determine from the plurality of segment sizes a preferred segment size for decompressing the compressed message; and send the preferred segment size, along with the compressed message, to a receiver for use in decompressing the compressed message in a speech decompression algorithm.

10. The controller of claim 9, wherein the processing system is further programmed, for each portion of the plurality of portions, to:

examine the portion to measure a plurality of quantized pitch periods therein; and determine a plurality of quantization levels which can accommodate the plurality of quantized pitch periods.

11. The controller of claim 10, wherein the processing system is further programmed to pair the plurality of quantization levels with a corresponding plurality of counts, a count indicating how many of the plurality of quantized pitch periods match a quantization level that is paired with the count.

12. The controller of claim 11, wherein the processing system is further programmed to arrange the plurality of quantization levels and the corresponding plurality of counts in an order corresponding to quantization level, thereby creating an ordered plurality of quantization levels and a corresponding ordered plurality of counts.

13. The controller of claim 12, wherein the processing system is further programmed to select a preferred pitch period from the ordered plurality of quantization levels, the preferred pitch period being a smallest one of the ordered plurality of quantization levels that is greater in level than a predetermined percentage of the plurality of quantized pitch periods, as determined from the corresponding ordered plurality of counts.

14. The controller of claim 9, wherein the processing system is further programmed to:

determine a plurality of quantization levels which can accommodate the plurality of segment sizes; and pair the plurality of quantization levels with a corresponding plurality of counts, a count indicating how many of the plurality of segment sizes match a quantization level that is paired with the count.

15. The controller of claim 14, wherein the processing system is further programmed to arrange the plurality of quantization levels and the corresponding plurality of counts in an order corresponding to quantization level, thereby creating an ordered plurality of quantization levels and a corresponding ordered plurality of counts.

16. The controller of claim 15, wherein the processing system is further programmed to select the preferred segment size from the ordered plurality of quantization levels, the preferred segment size being a smallest one of the ordered plurality of quantization levels that is greater in level than a predetermined percentage of the plurality of segment sizes, as determined from the corresponding ordered plurality of counts.

* * * * *